Nov. 10, 1953  W. V. HARRISON  2,659,018
ENGINE STARTER CONTROL SYSTEM
Filed Nov. 18, 1950
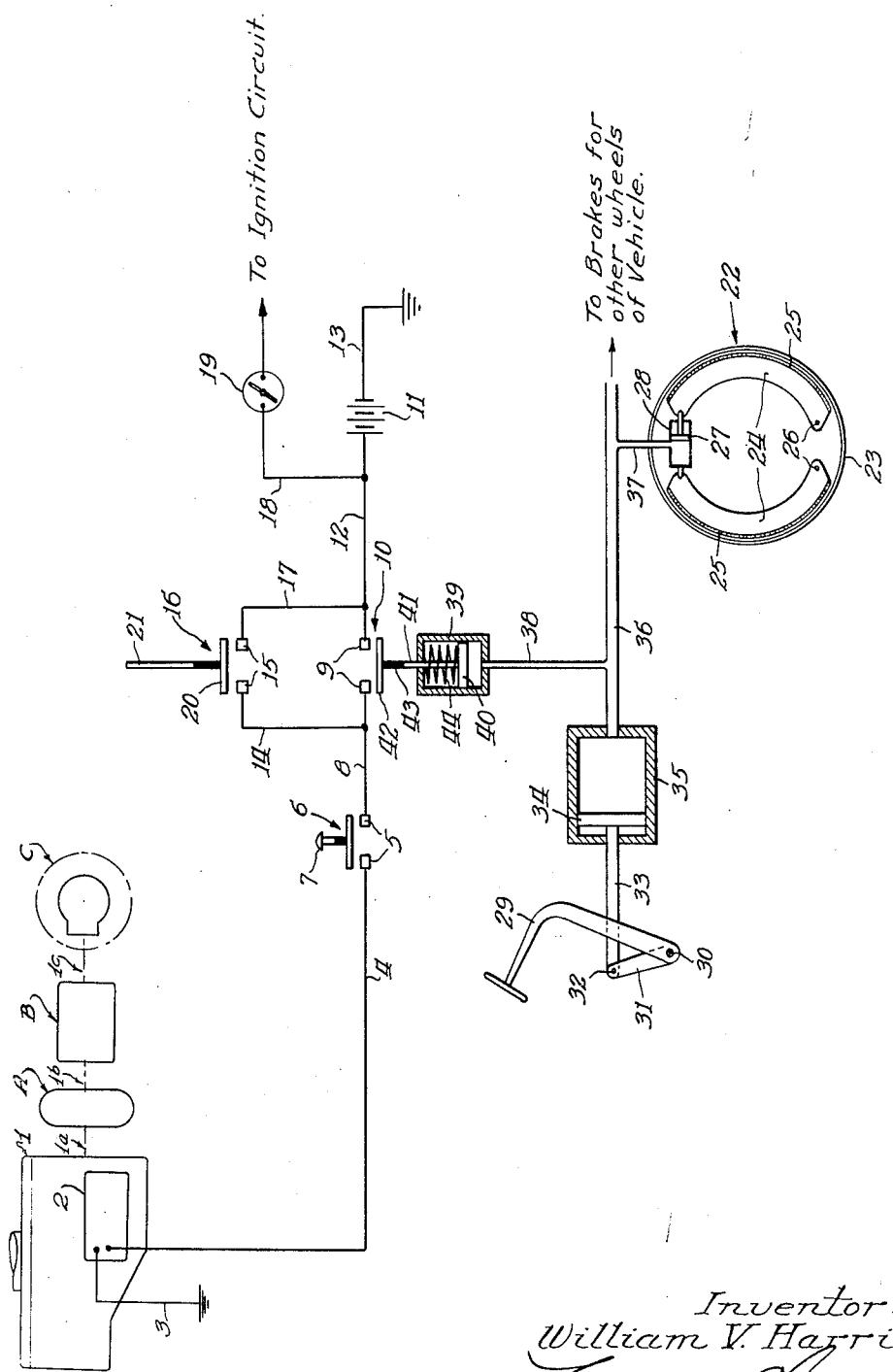
Inventor:
William V. Harrison
By: Edward ...
atty Patented Nov. 10, 1953

2,659,018

UNITED STATES PATENT OFFICE 2,659,018

ENGINE STARTER CONTROL SYSTEM

William V. Harrison, Muncie, Ind., assignor to Borg-Warner Corporation, Chicago, Ill., a corporation of Illinois Application November 18, 1950, Serial No. 196,406

1 Claim. (Cl. 290—38)

The present invention relates to automotive vehicles and more particularly to a system for controlling the starting of an automotive vehicle engine.

The broad object of the present invention is to provide means for enabling the starting of an automotive vehicle engine irrespective of whether or not the transmission of the vehicle is conditioned for neutral.

A more specific object of the present invention is to provide a circuit for actuating the starter motor of the vehicle engine when the vehicle brake is applied even though the transmission is not conditioned for neutral.

Another object of the present invention is to provide a circuit for actuating the starter motor of the vehicle engine which includes a switch controlled by the vehicle brake and which is closed only when the brake is applied.

Another object of the present invention is to provide a circuit for actuating the starter motor of a vehicle engine which includes a shifter lever controlled switch that is closed when the shifter lever occupies its neutral position, and a brake controlled switch, connected in parallel with the shifter lever controlled switch, and which is closed when the vehicle brake is applied, whereby the operator of the automotive vehicle may start the engine thereof whenever the brake is applied even though the transmission is not conditioned for neutral.

The present invention is particularly suitable for use in automotive vehicles equipped with a hydrodynamic coupling device such as a fluid coupling or a fluid torque converter between the engine crankshaft and the vehicle transmission. It has been the practice to provide a switch in the vehicle engine starter circuit that is closed only when the transmission is conditioned for neutral and in such case, it is essential that the shift lever be in its neutral position in order to start the vehicle engine. By the present invention it is no longer necessary to place the shifter lever in its neutral position as the starter of the vehicle may be actuated whenever the vehicle brake is applied.

The above and other objects and advantages of the present invention will become apparent from the following detailed description when read in conjunction with the accompanying schematic drawing of the invention.

With reference to the drawing, an automotive vehicle engine of the internal combustion type is represented generally by reference numeral 1. The engine 1 has a crank shaft 1ª adapted to drive a hydrodynamic coupling device A which may be either a fluid coupling or a hydraulic torque converter. The hydrodynamic coupling device A drives an output shaft 1ᵇ which is connected with a conventional transmission B and the transmission B is connected to drive the vehicle driving wheels, represented schematically by reference character C, through the intermediary of a transmission output shaft 1ᶜ. The engine 1 is equipped with a starter motor 2 having a pair of terminals which are connected respectively with a grounded lead 3 and with a lead 4. The lead 4 is connected to one contact 5 of a starter switch 6 which may be closed by an actuating button 7 that is located in any convenient location in the vehicle, preferably either in the floorboard or in the dashboard.

The other contact 5 of the starter switch 6 is connected to a lead 8, that is also connected to one of the contacts 9 of a brake controlled switch 10. The other contact 9 is connected to one terminal of the vehicle battery 11 by means of a lead 12 and the other terminal of the battery 11 is grounded through a lead 13. A lead 14 connects the lead 8 with one contact 15 of a selector lever controlled switch 16. The other contact 15 is connected with the lead 12 by means of a lead 17. As is apparent from the drawing, the brake controlled switch 10 and the selector lever controlled switch 16 are connected in parallel and when either switch is closed the leads 8 and 12 are electrically connected. A lead 18 is also connected with the lead 12 and provides a circuit from the battery 11 through an ignition switch 19 to the usual ignition circuit.

The selector lever control switch 16 includes a bridging arm 20 which is movable into engagement with both of the contacts 15. The bridging arm 20 has an operating lever 21 connected in any convenient manner so as to be moved to a position whereby the switch 16 is closed whenever the selector lever (not shown) is moved to its neutral position. When the selector lever is moved to a position corresponding to any gear ratio between the engine crankshaft and the vehicle wheels, such as high, low or reverse, the bridging arm 20 occupies the position as shown and in this position the switch 16 is open.

The present invention is herein disclosed in connection with an automotive vehicle equipped with fluid pressure operated brakes which are represented by the single brake shown schematically and represented generally by reference numeral 22. The brake 22 comprises a drum 23 and a pair of shoes 24 faced with friction material 25 for engaging the drum 23 and pivotally mounted as at 26. The two brake shoes 24 are respectively connected with a piston 27 and a cylinder 28. When fluid under pressure is admitted to the cylinder 28 the piston 27 is moved to the right and the cylinder 28 is moved to the left to cause the friction material 25 on each of the shoes 24 to engage the drum 23 and thereby brake the vehicle wheels (not shown).

A brake operating pedal 29, which extends through the floorboard (not shown) of the vehicle, is secured to a rotatable shaft 30. Also secured to the rotatable shaft 30 is a lever 31 which is pivotally connected at 32 to a piston rod 33 having a piston 34 secured to its other end. The piston 34 is reciprocable within a cylinder 35 and when the brake pedal 29 is depressed (moved clockwise with the shaft 30) the piston 34 is moved to the right, thereby compressing the fluid on the right side of the piston 34 and contained in the cylinder 35. The cylinder 35 is connected by means of a fluid conduit 36 and a series of branch conduits 37 with the cylinders 28 in each of the brakes 22. When the fluid in the cylinder 35 is compressed due to depression of the brake pedal 29, the pressure of the fluid is increased in the cylinder 28 and the brakes 22 are thereby applied.

The conduit 36 communicates with a conduit 38 leading to a cylinder 39. A piston 40 is reciprocable within the cylinder 39 and has a piston rod 41 connected thereto which is also connected to an arm 42 of the brake controlled switch 10. The piston rod 41 may be insulated from the arm 42 as indicated at 43. A spring 44, of the compression type, is seated behind the piston 40, abutting one end of the cylinder 39, and continuously urges the piston 40 to the position as shown such that the arm 42 does not bridge the contacts 9. When the brake pedal 29 is depressed to thereby cause compression of the fluid in the cylinder 35, fluid under pressure flows through the conduits 36 and 38 into the cylinder 39 and moves the piston 40 to a position whereby the arm 42 bridges the contacts 9 to thereby close the brake controlled switch 10.

In the operation of the present system, if the shifter lever has been moved to neutral position such that the arm 20 bridges the contacts 15, a circuit is completed for energizing the engine starter motor 2 when the operator of the vehicle depresses the button 7 to close the switch 6. This circuit extends from ground over the lead 13, through the battery 11, over the leads 12 and 17, through the closed selector lever actuated switch 16, over the leads 14 and 8, through the closed starter switch 6, over the lead 4, through the starter motor 2 and over the lead 3 to ground. If the transmission is conditioned for a gear ratio, such as high, low or reverse, under which condition the switch 16 is open, depression of the starter button 7 is ineffective to complete an energizing circuit to the starter motor 2 unless the brake pedal 29 is depressed to supply fluid under pressure to the brake operating cylinders 28 and to the brake controlled switch operating cylinder 39. When fluid under pressure is supplied to the cylinder 39, the piston 40 is moved against the urging of spring 44 to cause the arm 42 to bridge the contacts 9 and thereby close the switch 10. When the switch 10 is closed, even though the switch 16 is open, depression of the starter button 7 closes the switch 6 to complete an energizing circuit for the starter motor 2. This circuit extends from ground over the lead 13, through the battery 11, over the lead 12, through the closed switch 10, over the lead 8, through the closed starter switch 6, over the lead 4, through the starter motor 2 and over the lead 3 to ground.

From the foregoing description of the present invention it is apparent that a simple and efficient control system has been provided for actuating the starter motor of an automotive vehicle whenever either the selector lever is in its neutral position or the vehicle brakes are applied.

It is contemplated that numerous changes and modifications may be made in the present invention without departing from the spirit or scope thereof.

I claim:

In a system for controlling the starting of an automotive vehicle engine, the combination of a starter motor for starting the engine, a vehicle transmission having a shifter lever and disposed between the engine and driving means for said vehicle, a hydrodynamic coupling device between the engine and the vehicle transmission, a circuit for actuating said starter motor, a first switch in said circuit controlled by the vehicle transmission shifter lever movable to a closed position when the shifter lever is moved to its neutral position and movable to an open position when the shifter lever is moved to any position other than its said neutral position, a brake for the vehicle, a second switch in said circuit and connected in parallel with said first switch, said second switch being movable to a closed position upon application of said vehicle brake and movable to an open position upon release of said vehicle brake, and a manually controlled switch for completing said circuit to actuate said starter motor to start the vehicle engine when either of said first-named switches occupies its closed position.

WILLIAM V. HARRISON.

References Cited in the file of this patent

UNITED STATES PATENTS

| Number | Name | Date |
| --- | --- | --- |
| 1,137,519 | Newburger | Apr. 27, 1915 |
| 1,293,569 | Stein | Feb. 4, 1919 |
| 1,386,844 | Cowen | Aug. 9, 1921 |
| 1,771,866 | Stevenson et al. | July 29, 1930 |
| 1,936,619 | Christian | Nov. 28, 1933 |
| 1,979,836 | Kryzer | Nov. 6, 1934 |